Feb. 9, 1954     L. J. KMIECIK     2,668,663
THERMOSTATIC VALVE
Filed Dec. 17, 1951
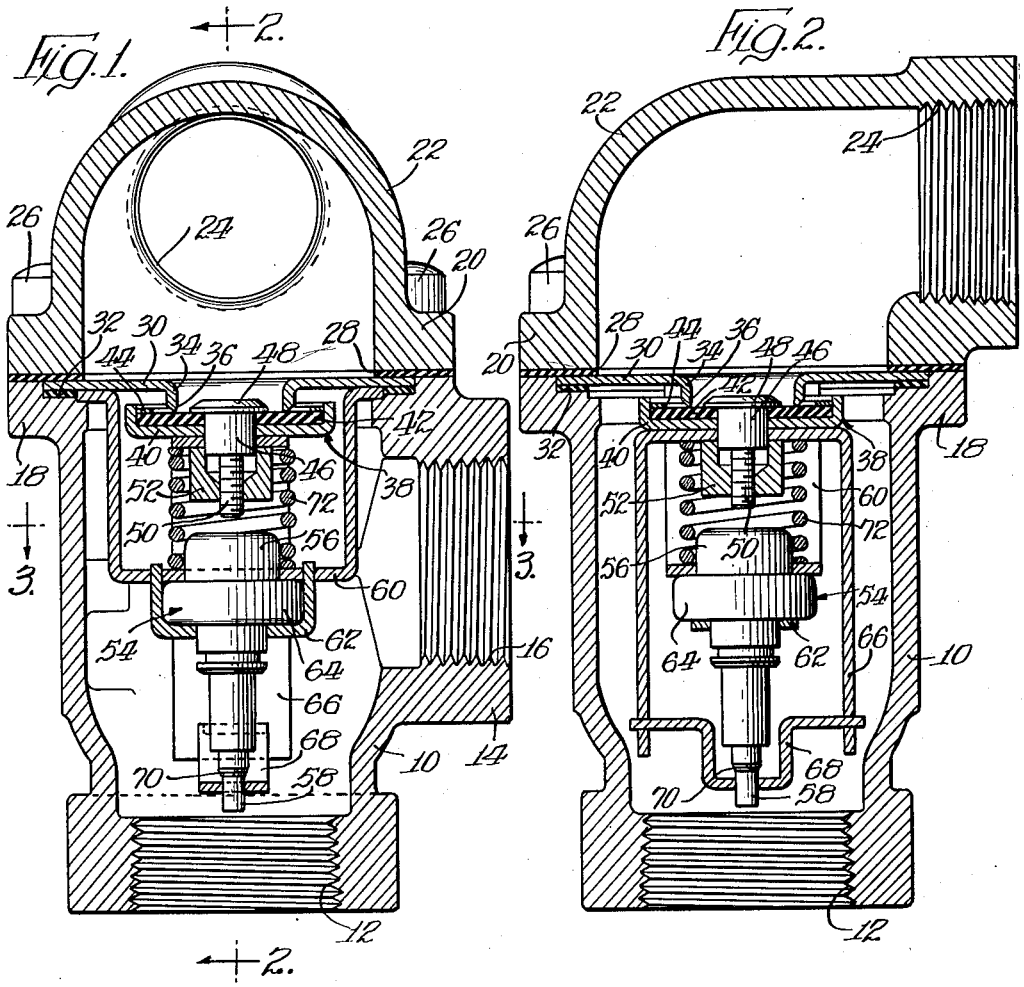
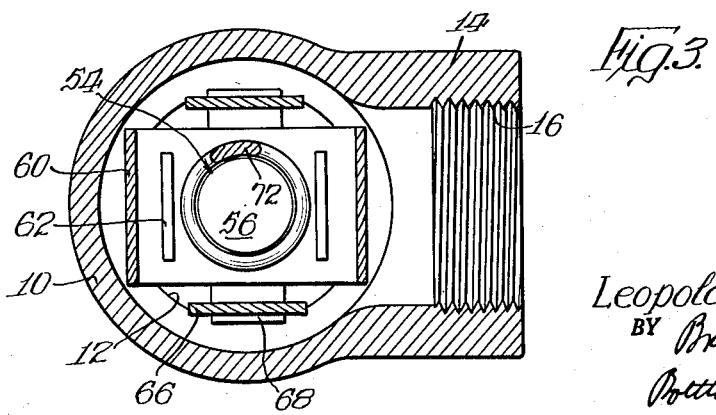
INVENTOR.
Leopold J. Kmiecik Patented Feb. 9, 1954

2,668,663

UNITED STATES PATENT OFFICE 2,668,663

THERMOSTATIC VALVE

Leopold J. Kmiecik, Chicago, Ill., assignor to McDonnell & Miller, Inc., Chicago, Ill., a corporation of Delaware Application December 17, 1951, Serial No. 262,061

3 Claims. (Cl. 236—93)

The present invention relates to improvements in temperature responsive valves.

An object of the present invention is the provision of improved temperature responsive valves of the general character comprising a valve body having an inlet, a first outlet and a second valve controlled outlet, and a temperature responsive element disposed in the normal path of fluid flow through the valve adapted to actuate the valve controlling the second outlet.

Valves of the general character described are known, but all have suffered serious disadvantages. The most disadvantageous feature of prior valves, which disadvantage is suffered by all of the prior valve structures of which I am aware, is that the valve is seated against fluid pressure. In other words, fluid pressure of the medium to be controlled passing through the inlet and open outlet exerts an opening force on the valve, which force must be resisted by the temperature responsive device. Such relationship presents several difficulties among which are: ready leakage of fluid past the valve; improper seating of the valve; rapid deterioration of the temperature responsive element; wire drawing of the valve and its seat; and improper relief of the medium to be controlled. In spite of the aforesaid difficulties, the relationship stated has been adhered to.

A further disadvantage of conventional temperature responsive valves is the employment therein of temperature responsive elements that are inherently sensitive to pressure. For example, bellows type temperature responsive units have been most frequently utilized in temperature responsive valves. While liquid filled bellows are responsive to variations in temperature, they also are sensitive to pressure. Temperature responsive valves should be completely insensitive to pressure if same are to effect the true control function for which they are intended. However, substantially all prior valves of the general character referred to are pressure sensitive and therefore fail to accomplish this control function. In addition, pressure sensitive temperature responsive devices practically necessitate closing the valve against fluid pressure. In an endeavor to counteract the pressure sensitivity of the temperature responsive bellows, some prior art structures have included a second bellows adapted to conpensate for and counteract the effect of pressure on the temperature sensing bellows. However, such additional bellows does not truly compensate and exactly offset the pressure effect on the temperature sensing bellows, does not accommodate closing of the valve by fluid pressure and increases the cost of manufacture and assembly of the valve.

It is an object of the present invention to overcome the disadvantages of prior temperature responsive valves by providing a valve including a pressure insensitive-temperature responsive element adapted to actuate a valve which is normally held to its seat by fluid pressure of the medium to be controlled.

Another object of the present invention is to provide an improved temperature responsive valve of the character described including a pressure insensitive-temperature responsive device disposed in the normal path of fluid flow of the medium to be controlled through the valve body and adapted to actuate a valve to effect relief of the system with which the valve is associated solely in response to temperature variations of the medium to be controlled.

A further object of the invention is the provision of the improved temperature responsive valves of the character described adapted to perform a true control function, the valve being of improved manufacture and assembly and being adapted for continuous use throughout substantially the life of the physical apparatus of the system with which associated.

A still further object of the present invention is the provision of temperature responsive valves of improved and economical manufacture and assembly.

Other objects and advantages of the present invention will become apparent in the following detailed description of a preferred embodiment of the invention.

Now in order to acquaint those skilled in the art with the manner of constructing and operating a device embodying my invention, I shall describe, in connection with the accompanying drawings, a specific embodiment of the same.

In the drawings, in which like reference characters indicate like parts:

Figure 1 is a vertical cross-section of the improved temperature responsive valve of the present invention;

Figure 2 is a vertical cross-section of the improved valve of the present invention, the view being taken substantially on line 2—2 of Figure 1; and Figure 3 is a horizontal cross-sectional view of the improved valve, the view being taken substantially on line 3—3 of Figure 1.

Referring now to the drawings, the improved temperature responsive valve of the present invention is shown as including a cylindrical body 10 provided at its lower end with a threaded aperture 12 constituting the inlet to the valve and adapted for the reception of an inlet pipe or conduit. The inlet pipe or conduit may lead from a hot water tank or may comprise a portion of a fluid system, the temperature of which fluid is to be controlled by the device of the present invention. The body portion 10 is provided substantially intermediate its ends with a radial boss 14 having a threaded outlet 16 therein comprising the normal and continuously open outlet for the valve. At its upper end, the cylindrical body 10 is provided with an outwardly extending radial flange 18 adapted for the reception of the flanged lower portion 20 of a generally L-shaped body or cap member 22. The cap member 22 is hollow and is provided with a threaded radial outlet 24. The outlet 24 comprises a relief port for the valve of the present invention and is preferably offset approximately 90° with respect to the outlet 16 so that suitable piping or similar conduit means may be threaded into each of the outlets without interference. The body portions 10 and 22 are preferably secured together at their flanged portions 18 and 20 by means of a plurality of machine screws 26 extending through the flanges of the body portions. If desired, a suitable annular gasket 28 may be disposed between the flange portions 18 and 20 of the body members to provide a seal therebetween. The cylindrical body member 10 defines a generally L-shaped path of flow, which is the normal path of flow through the valve, namely through the inlet 12 and the outlet 16. The cap member 22 provides a relief port, namely the outlet 24, adapted to be valve controlled.

The valve means of the temperature responsive valve of the present invention includes an annular valve seat member 30 adapted to be confined between the body members 10 and 22. The cylindrical body 10 may be suitably provided at its upper end with an annular recess adapted for the reception of the peripheral portions of the annular seat member 30 so that the member 30 may be suitably confined between the two members. The valve seat member is preferably sealed with respect to the body members by means of the annular gasket 28 engaging the upper surface thereof and a second annular gasket 32 engaging the lower surface thereof. The annular valve seat member is provided at its central portion with an annular flange 34 extending axially into the cylindrical body member 10 and terminating in a valve seat 36. The valve seat 36 is preferably rounded to provide a small area valve seat and to prevent cutting of the resilient valve member adapted to cooperate therewith.

The valve member of the temperature responsive valve of the present invention is indicated generally at 38 and comprises a cup-shaped metallic member 40 adapted for the reception of an annular gasket 42 and a clamping ring 44 adapted to be secured within the cup-shaped member 40 to secure the peripheral portions of the annular valve seal 42 within the cup-shaped member 40. The clamping ring 44 may be suitably press fit into the cup member 40 or may be secured therein by crimping portions of the cup member over onto the upper surface of the clamping ring. The valve member 38 is provided with a valve stem 46 adapted to extend through central apertures provided in the seal 42 and the cup-shaped member 40. The valve stem 46 is provided with a head 48 adapted to engage the upper surface of the seal 42 and secure the central portion of the seal to the cup-shaped member. The valve stem 46 is provided at its lower end with a threaded stem portion 50 adapted for the reception of a nut 52 or the like by means of which the stem is secured to the valve member.

To effect actuation of the valve member, the temperature responsive valve of the present invention includes a motor unit, indicated generally at 54, of the pressure insensitive-temperature responsive type. Any thermally responsive device that is insensitive to pressure may be utilized in the valve of the present invention, but a preferred device of the general character is of the type disclosed in Patent No. 2,128,274 to S. Vernet and Patent No. 2,259,846 to S. Vernet et al. The motor unit 54, of the type disclosed in the two identified patents, comprises a metallic body and includes a cylinder or cylinder portion 56 containing a charge of temperature responsive material and a plunger or piston 58 adapted to be actuated by the material upon variations in volume of the material as caused by variations of temperature. The motor unit 54 is supported within the cylindrical body member 10 in spaced relation to the valve member 38 by means of a U-shaped strap 60 which is provided at its upper end with outwardly extending tabs adapted to be confined between the two body members 10 and 22. Preferably, an annular groove is provided in the body member 10 for the reception of the outwardly extending tabs of the U-shaped strap 60 so that the strap may be secured within the body member by means of the valve seat member 30. The U-shaped strap 60 is provided in its central or bight portion with a central aperture adapted for the reception of the cylinder portion 56 of the motor unit 54. To either side of the central aperture therethrough, the bight portion of the strap 60 is provided with a slot adapted for the reception of the upper ends of the legs of a U-shaped strap 62. The legs of the U-shaped strap 62 may be suitably secured to the U-shaped strap 60 by peening over portions of the legs of the strap 62 extending through the bight portion of the strap 60. The bight portion of the strap 62 is provided with a central aperture adapted for the reception of a reduced portion of the motor unit 54 and is adapted to confine the body portions 64 of the motor unit 54 between the bight portions of the straps 60 and 62. Accordingly, it will be appreciated that the cylinder portion 56 of the motor unit 54 is held stationary with respect to the body member 10 so that the plunger 58 of the motor unit is adapted for actuation of the valve member 38. The plunger portion 58 of the motor unit is preferably operatively associated with the valve member 38 by means of an inverted U-shaped strap 66 adapted to be secured to the cup-shaped member 40 of the valve member by the nut 52 of the valve stem. Preferably, the bight portion of the strap 66 is provided with a central aperture adapted for the reception of the valve stem 46 so that the bight portion of the strap 66 may be secured to the lower surface of the cup member 40 by means of the valve stem nut 52. The legs of the strap 66 are preferably slotted adjacent their lower ends for the reception of outwardly extending flange portions of a generally U-shaped strap 68. The U-shaped strap 68 bridges the space between the legs of the strap 66 and is provided in its central or bight portion with a central aperture adapted for the reception of the plunger 58 of the motor unit 54. The plunger 58 may be press fit within the central aperture in the strap 66, if desired. Preferably, however, the plunger 58 is freely received within the central aperture in the strap 68 and operative connection between the strap and the plunger is accomplished by means of a shoulder 70 provided on the plunger 58 and adapted to abut against the bight portion of the strap 68. By the latter method, the plunger 58 is provided with freedom of movement with respect to the strap 68 so that the plunger may move freely in response to actuation by the expansible material contained within the cylinder portion 56 of the motor unit. The shoulder 70 defines the temperature at which actuation of the valve member 38 will occur, or more properly, the spaced relation of the shoulder 70 and the bight portion of the strap 68, together with the operating characteristics or expansion of the motor unit 54, defines the temperature at which valve actuation occurs.

To hold the valve member 38 in its normal position in engagement with the valve seat 36, a compression coil spring 72 is suitably confined between the bight portion of the strap 66 and the bight portion of the strap 68. The coil spring 72 is suitably retained against lateral movement by means of the cylindrical portion 56 of the motor unit 54 and the nut 52, both of which are encompassed by the spring.

In use, the temperature responsive valve of the present invention is disposed in the line of a fluid medium, with the inlet 12 and the outlet 16 forming portions of the normal flow line. Accordingly, the path of fluid flow through the valve will be through the inlet 12 over the surface of the motor unit 54 and to the outlet 16. The motor unit 54 is formed preferably with a metallic casing so that the expansible material within the motor unit is responsive solely to variations in temperature of the medium flowing through the valve and is not in any way affected by the pressure of the fluid medium. Accordingly, the fluid pressure within the body portion 10 of the valve will have no direct effect upon the motor unit 54 and the reactions of the motor unit will be responsive solely to temperature variations. The valve member 38 is held to its seat 36 on the valve seat member 30 by means of the spring 72 and fluid pressure within the body portion 10. Accordingly, the valve member will be held securely to its seat so that there will be no leakage or seepage past the valve seat. The valve member 38 is adapted to be opened only when the temperature of the medium within the body member 10 rises above a predetermined maximum, at which time, the plunger 58 of the motor unit 54 will be moved to such extent as to bring the shoulder 70 on the plunger 58 into engagement with the U-shaped strap 68 to force the strap 68, the strap 66 and the valve member 38 downwardly away from the stationary valve seat member 30. Accordingly, the valve member 38 will be moved to open position solely in response to variation in temperature so as to vent the system with which associated of fluid medium of a temperature beyond a predetermined and desired maximum.

Substantial force in the motor unit 54 will be required to initially move the valve member 38 away from its seat, due to the differential in area and pressure on opposite sides of the valve member when the valve member is closed. However, when the valve member is cracked, the resistance to movement of the valve member 38 will be represented solely by the spring 72 since equal areas on opposite sides of the valve member will then be exposed to the same fluid flow. Accordingly, the motor unit 54 will be adapted to initially crack the valve and then to rapidly move the valve to a substantially full open position to provide for rapid and efficient venting of the system of fluid medium of a temperature above a predetermined maximum. Upon decrease of temperature of the medium to be controlled, the motor unit 54, being directly subject on all sides to flow through the valve body, will immediately sense the variation in temperature and release the strap member 66 and 68 and the valve member 38 so that the spring 72 may rapidly return the valve 38 to closed position. More specifically, the pressures on opposite sides of the valve being substantially balanced, the spring 72 will readily move the valve towards its seat, and as the valve approaches its seat, fluid pressure within the body portion 10 of the valve will rapidly move the valve member 38 to a fully seated position.

The relief port outlet 24 may be suitably connected to pipes leading to a drain or any suitable point of disposal or the like in accordance with requirements of the installation with which associated.

In view of the foregoing, it will be appreciated that the present invention provides a temperature responsive valve including a pressure insensitive-temperature responsive element disposed directly within the path of fluid flow of the medium to be controlled and adapted to actuate a valve to control the discharge of the fluid medium to be controlled, the valve member of the construction being normally held to its seat by fluid pressure of the medium to be controlled. It will thus be appreciated that the valve of the present invention is positive in action and responsive only to variations in temperatures so as to effectively and efficiently accomplish the function for which intended. It will also be apparent that the valve is economical in manufacture and construction and has few moving parts so that the valve unit will be capable of efficient service throughout substantially the full life of the physical elements of the fluid system with which associated.

While I have described what I regard to be a preferred embodiment of my invention, it will be apparent that various changes, rearrangements and modifications may be made therein without departing from the scope of the invention, as defined by the appended claims.

I claim:
1. A temperature responsive valve comprising body means having a continuously open fluid inlet, a laterally disposed continuously open first fluid outlet and a second fluid outlet, said inlet and said first outlet defining a generally L-shaped path of normal fluid flow, said second outlet being disposed outside of said path of normal fluid flow, a valve seat in said body means disposed in axial alignment with said inlet between said inlet and said second outlet, a valve member movable within said body means for cooperation with said valve seat, said valve member being disposed to the inlet side of said valve seat so as to be held to said seat by fluid pressure of the medium flowing in said path of normal fluid flow, a pressure insensitive-temperature responsive unit disposed in said body means between said inlet and said valve member and between said inlet and said first outlet so as to be disposed directly in the path of normal fluid flow, said pressure insensitive-temperature responsive unit comprising a cylinder element, a relatively movable piston element and temperature responsive actuating means confined between said piston and said cylinder, said piston and cylinder elements being disposed in axial alignment with said inlet and said valve member, a first open frame supporting one of said elements stationarily in said body means, a second open frame operatively connecting the other of said elements and said valve member, and a spring confined between the stationarily supported element of said pressure insensitive-temperature responsive unit and said valve member normally to bias said valve member toward said valve seat.

2. A temperature responsive valve comprising body means having a continuously open fluid inlet, a laterally disposed continuously open first fluid outlet and a second fluid outlet, said inlet and said first outlet defining a generally L-shaped path of normal fluid flow, said second outlet being disposed outside of said path of normal fluid flow, a valve seat in said body means disposed in axial alignment with said inlet between said inlet and said second outlet, a valve member movable within said body means for cooperation with said valve seat, said valve member being disposed to the inlet side of said valve seat so as to be held to said seat by fluid pressure of the medium flowing in said path of normal fluid flow, a pressure insensitive-temperature responsive unit disposed in said body means between said inlet and said valve member and between said inlet and said first outlet so as to be disposed directly in the path of normal fluid flow, said pressure insensitive-temperature responsive unit comprising a cylinder element, a relatively movable piston element and temperature responsive actuating means confined between said piston and said cylinder, said piston and cylinder elements being disposed in axial alignment with said inlet and said valve member, a first open frame supporting one of said elements stationarily in said body means, a second open frame operatively connecting the other of said elements and said valve member, and a spring confined between the stationarily supported element of said pressure insensitive-temperature responsive unit and said valve member normally to bias said valve member toward said valve seat, said valve member being disposed in said body means independently of said body means and being retained and guided for movement in said body means solely by said spring.

3. A temperature responsive valve comprising body means having a continuously open fluid inlet, a laterally disposed continuously open first fluid outlet and a second fluid outlet, said inlet and said first outlet defining a generally L-shaped path of normal fluid flow, said second outlet being disposed outside of said path of normal fluid flow, a valve seat in said body means disposed in axial alignment with said inlet between said inlet and said second outlet, a valve member movable within said body means for cooperation with said valve seat, said valve member being disposed to the inlet side of said valve seat so as to be held to said seat by fluid pressure of the medium flowing in said path of normal fluid flow, a pressure insensitive-temperature responsive unit to be disposed directly in the path of normal fluid flow, said pressure insensitive-temperature responsive unit comprising a cylinder element, a relatively movable piston element and temperature responsive actuating means confined between said piston and said cylinder, said piston and cylinder elements being disposed in axial alignment with said inlet and said valve member, a first open frame fixed to said body means and extending between said inlet and said valve member to afford a stationary support in said body means for one of said elements, a second open frame operatively connecting the other of said elements and said valve member, and a spring confined between said first open frame and said valve member normally to bias said valve member toward said valve seat.

LEOPOLD J. KMIECIK.

References Cited in the file of this patent

UNITED STATES PATENTS

| Number | Name | Date |
|---|---|---|
| 1,694,071 | Mallory | Dec. 4, 1928 |
| 1,784,061 | Giesler | Dec. 9, 1930 |
| 1,792,891 | Clifford | Feb. 17, 1931 |
| 2,326,096 | Dillman | Aug. 3, 1943 |
| 2,419,630 | Cruzan | Apr. 29, 1947 |